(12) United States Patent
Hans

(10) Patent No.: US 7,132,773 B2
(45) Date of Patent: Nov. 7, 2006

(54) BRUSHLESS DIRECT CURRENT MOTOR

(75) Inventor: Helmut Hans, Sankt Georgen (DE)

(73) Assignee: Minebea Co. Ltd., Nagano-ken (JP)

( * ) Notice: Subject to any disclaimer, the term of this patent is extended or adjusted under 35 U.S.C. 154(b) by 0 days.

(21) Appl. No.: 11/151,351

(22) Filed: Jun. 14, 2005

(65) Prior Publication Data

US 2005/0280326 A1      Dec. 22, 2005

(30) Foreign Application Priority Data

Jun. 21, 2004  (DE) ...................... 10 2004 029 983

(51) Int. Cl.
  *H02K 3/00*  (2006.01)
  *H02K 1/00*  (2006.01)
(52) U.S. Cl. ...................... 310/184; 310/216; 310/217; 310/185
(58) Field of Classification Search ................ 310/179, 310/180, 184, 185, 186, 187, 216, 217
See application file for complete search history.

(56) References Cited

U.S. PATENT DOCUMENTS 4,990,809 A * 2/1991 Artus et al. ................. 310/192

6,329,733 B1 * 12/2001 Katsumata et al. ........ 310/90.5

FOREIGN PATENT DOCUMENTS

| DE | 10229333 | 1/2004 |
|---|---|---|
| JP | 62221854 | 9/1987 |

\* cited by examiner

*Primary Examiner*—Tran Nguyen
(74) *Attorney, Agent, or Firm*—Duane Morris LLP

(57) ABSTRACT

A direct current motor having a stator that has a plurality of radially arranged stator pole bridges to each of which one phase is allocated, at least one stator pole group being formed by at least two adjoining stator poles which are associated with the same phase, no winding sections being provided between the stator poles of the at least one stator pole group and the respective stator pole bridges of this stator pole group being disposed with a smaller spacing between each other than two adjoining stator pole bridges that are associated with different phases.

19 Claims, 3 Drawing Sheets

BRUSHLESS DIRECT CURRENT MOTOR

FIELD OF THE INVENTION

The invention relates to a brushless direct current motor having a stator that comprises a plurality of radially arranged stator pole bridges to each of which one phase is allocated.

BACKGROUND OF THE INVENTION

Brushless DC motors include a rotatable rotor having a constant magnetic field, as well as a stator which can be used to generate a rotating magnetic field. The rotating magnetic field generates a torque that is not constant. In fact, fluctuations are produced in the torque that are a function of the construction of the rotor and the stator, and of their position with respect to each other. In the prior art, it is known to choose various combinations of the number of stator slots and the number of rotor poles depending on the desired motor parameters, such as the output of the motor, cogging torque and redundancy of the motor windings. This means, for example, that a motor having nine pole heads or slots in the stator and sixteen magnetic pole pairs in the rotor has the advantage that it generates very low cogging torque with 144 cogging torque cycles per rotation. Here, the rotor and stator are designed in such a way that the rotor poles have different angular offsets compared to the stator pole heads in order to thus compensate the transition of a rotor magnet from one pole head to the next by another pole head, which, in the same rotor position, lies opposite the center of another magnetic pole.

Such specifications for the structure of the rotor and the stator can produce a winding pattern for the winding of the stator in which for each phase, one slot or even several slots take on windings of the same phase with an opposed winding direction and thus opposed energization. The currents in the opposed winding sections of the same phase located in these slots offset each other and thus make no contribution at all to the build up of torque; the windings simply increase the winding resistance. The winding space in these kinds of motors is consequently not utilized effectively, which means that the motors need to have a comparatively large volume should a certain motor output be required. This results in low efficiency and relatively high costs in the manufacture of such a motor.

The object of the invention is to provide an improved brushless DC motor. The particular aim is to provide a DC motor which is not only compact and low-cost but also shows high efficiency. Moreover, the intention is to provide a DC motor that is light.

SUMMARY OF THE INVENTION

The object has been achieved by a DC motor according to the principles and the exemplary embodiments disclosed herein.

The motor according to the invention has a stator that has a plurality of radially arranged stator poles to which the individual phases are allocated according to the winding pattern. For each phase, at least one stator pole group is formed from at least two adjoining stator poles that are associated with the same phase. According to the invention, no winding sections are provided between the stator poles of this at least one stator pole group, the associated pole bridges of the respective stator pole group being arranged with a smaller spacing between each other than the bridges of two adjoining stator poles that are associated with different phases. At the same time, however, the winding arrangement of the pole heads on the side facing the rotor preferably remain unchanged.

The invention is based on the realization that the winding spaces, which in known motors contain opposed windings of the same phase and thus do not contribute to the build up of torque, can be reduced in order to create space for windings which make a contribution to the build up of torque. To this effect, the pole bridges for each stator pole group are moved closer together, whereby the minimum spacing of these pole bridges should correspond approximately to the width of the associated pole gaps. The small winding space thus formed may remain empty while the adjoining stator pole slots are enlarged and can accordingly accommodate more winding wire. Irrespective of the combination of the number of rotor poles and the number of stator slots, the motor according to the invention thus does not have any adjoining opposed windings of the same phase that do not contribute to the build up of torque. In fact, these winding sections are eliminated and the stator slot provided between the two stator poles of a stator pole group for this purpose in the prior art is reduced as far as possible, i.e. the pole bridges of the stator poles concerned are preferably moved closer together to the width of a stator pole gap, making considerably more winding space available for the other windings. Thus for the same combinations of the number of rotor poles and the number of stator slots, a significant improvement in the efficiency of the motor can be achieved.

In one embodiment, one or two stator pole groups are provided for each phase, each stator pole group being formed from two stator poles. In this way the stator pole groups, in whose intervening spaces no winding sections are provided, are distributed evenly over the stator, enabling a symmetric construction to be achieved and consequently a simple and low-cost manufacturing process to be realized.

Each stator pole is connected to a pole head, stator pole gaps being formed between the pole heads which are preferably distributed evenly in a circle and aligned about the circumference of the rotor.

The spacing between two pole bridges of a stator pole group, in whose intervening space no winding sections have been provided, preferably corresponds to the width of the stator pole gap between two adjoining pole heads. On the one hand, this arrangement allows unused winding space to be reduce to a minimum and, on the other hand, provides a DC motor in which the numbers of rotor poles and stator slots as well as the relative position of the rotor poles to the stator pole heads remain unchanged compared to motors of the prior art. At a higher output, this kind of motor can achieve the same operating performance in terms of torque ripple and cogging torque as a known motor having a corresponding combination of pole/slot numbers.

In an embodiment, the product of the number of stator poles and the number of rotor poles is the smallest number which can be divided in whole numbers by both the number of stator poles as well as by the number of rotor poles. In this embodiment, the respective angular offsets of each rotor pole differ from each other with respect to the corresponding opposing pole heads. As a result, the number of cogging cycles is maximized. An even distribution of cogging torque and thus a minimization of cogging torque is achieved. For example, in the case of a motor having nine slots and 16 poles, there is very low cogging torque at 144 cogging torque cycles per rotation. (144 is the smallest number that can be divided by both 9 and 16.) The higher the number of cycles, the lower is the cogging torque. This then goes to produce a very smooth running performance with low cogging torque and low torque ripple or fluctuations in the driving torque.

In another embodiment, at least one stator pole is disposed between two adjoining stator pole groups, the phase of the stator pole differing from the phases of the adjoining stator poles. This goes to ensure that stator pole groups whose pole bridges are disposed with only a small spacing between them are separated by an "unchanged" stator pole, thus simplifying the construction.

The motor preferably has nine stator slots and two rotor poles, nine slots and 16 rotor poles, 15 slots and four rotor poles or 18 slots and four rotor poles. DC motors having these combinations of the number of poles and the number of slots produce winding patterns in which two opposed windings of the same phase are located side by side in a stator slot, so that the winding sections in this stator slot do not contribute to the build up of torque. The respective winding sections can thus be eliminated and, according to the invention, the corresponding winding spaces can be reduced to the width of a stator pole gap, allowing the remaining stator pole slots to be increased as winding spaces.

The motor according to the invention preferably has three electric phases. The electric motor is preferably operated with DC voltage as a unipolar or bipolar motor. The three phases can be delta connected or just as equally connected in a star connection.

DETAILED DESCRIPTION OF PREFERRED EMBODIMENTS

Figure 1:
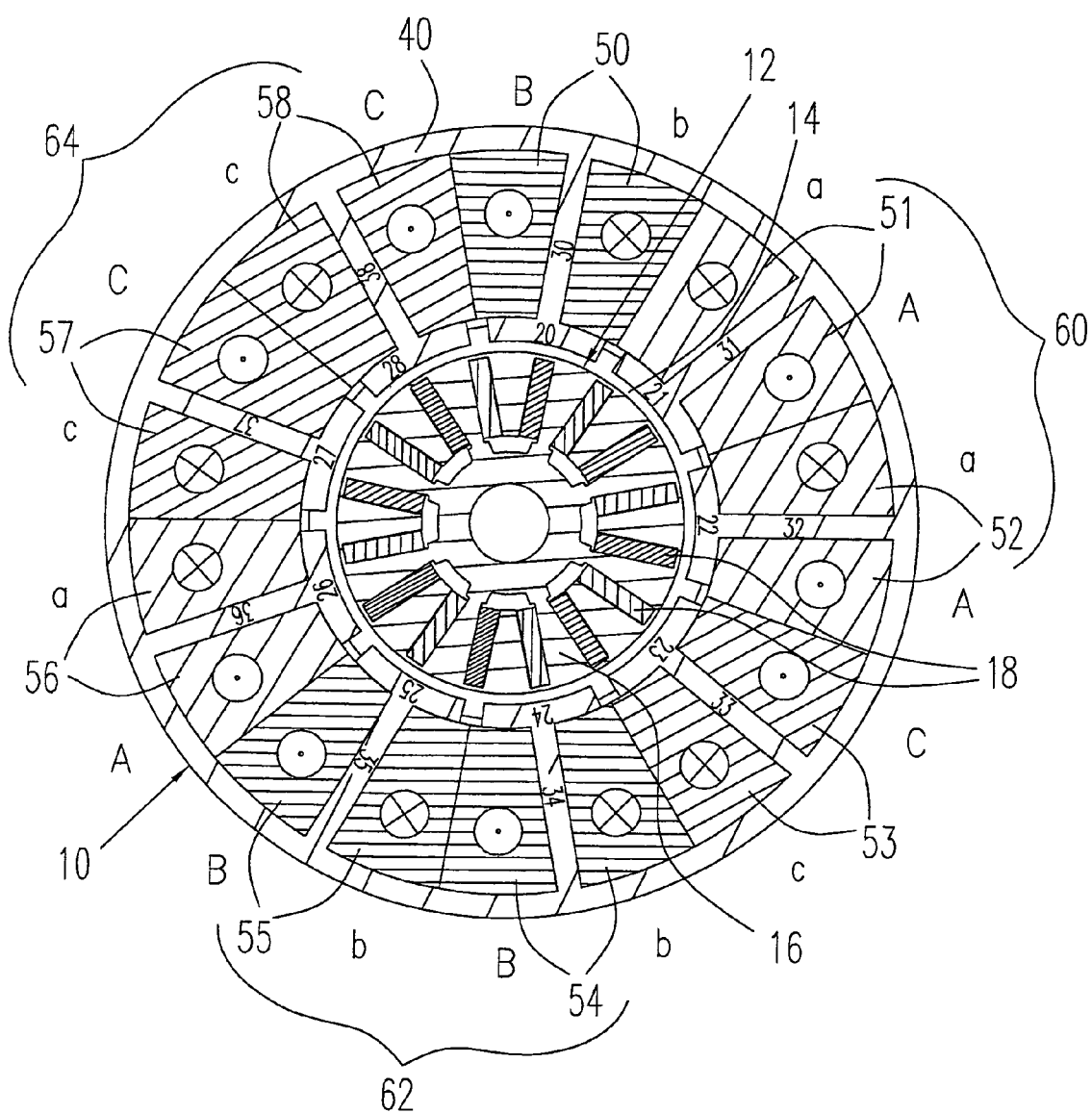
FIG. 1 shows a cross-section through a motor according to the prior art.

FIG. 1 shows a motor according to the prior art having nine slots and 16 rotor poles in cross-section. The number of stator pole slots, i.e. the spaces between two adjoining stator poles, corresponds to the number of stator poles. The motor consists of a stator 10 at whose center a rotor 12 is concentrically disposed. The rotor 12 has a rotor core 16 and 16 permanent magnets 18 embedded spoke-like in pairs in the rotor core. The rotor 12 is separated from the stator 10 by an air gap 14. The stator 10 has nine (9) pole heads 20 to 28 disposed evenly around the circumference of the rotor. A stator pole slot is formed between each two adjoining stator poles. Each pole head 20–28 is carried by a radially arranged pole bridge 30–38, the pole bridges abutting the pole heads perpendicularly and being connected to the middle of the pole heads. At their radially outer ends, the pole bridges are connected to a back yoke ring (stator yoke) 40 of the stator 10. Each of the pole bridges 30–38 carries stator windings 50–58, the winding direction or energizing direction being indicated by and . A circle containing a dot indicates a direction of current emerging from the drawing plane, whereas a circle containing a cross indicates a direction of current leading into the plane of the drawing.

The windings 50–58 of the three phases are preferably connected in a delta or a star connection (not illustrated). A three-phase electric motor is shown in FIG. 1. Here, the windings 51, 52 and 56 indicated by a or A correspond to a first phase of the motor, the windings 50, 54 and 55 indicated by b or B correspond to a second phase, and the windings 53, 57 and 58 indicated by c or C correspond to a third phase. Small letters used to indicate the winding sections describe a winding direction directed into the drawing plane, whereas capital letters indicate winding sections whose winding direction points out of the plane of the drawing.

Based on this prior art, in the invention two adjoining stator poles are joined together to form a stator pole group when they are associated with the same phase and enclose opposed winding sections. Thus stator poles 31 and 32 form a first stator pole group 60 since they are both associated with the first phase A and adjoin each other. In the same way, stator poles 34 and 35 form a second stator pole group 62, which is associated with the second phase B, while stator poles 37 and 38 form a third stator pole group 64, which is associated with the third phase C. The winding sections between two adjoining stator poles of a stator pole group do not contribute to the build up of torque because the corresponding currents cancel each other out.

Figure 2:
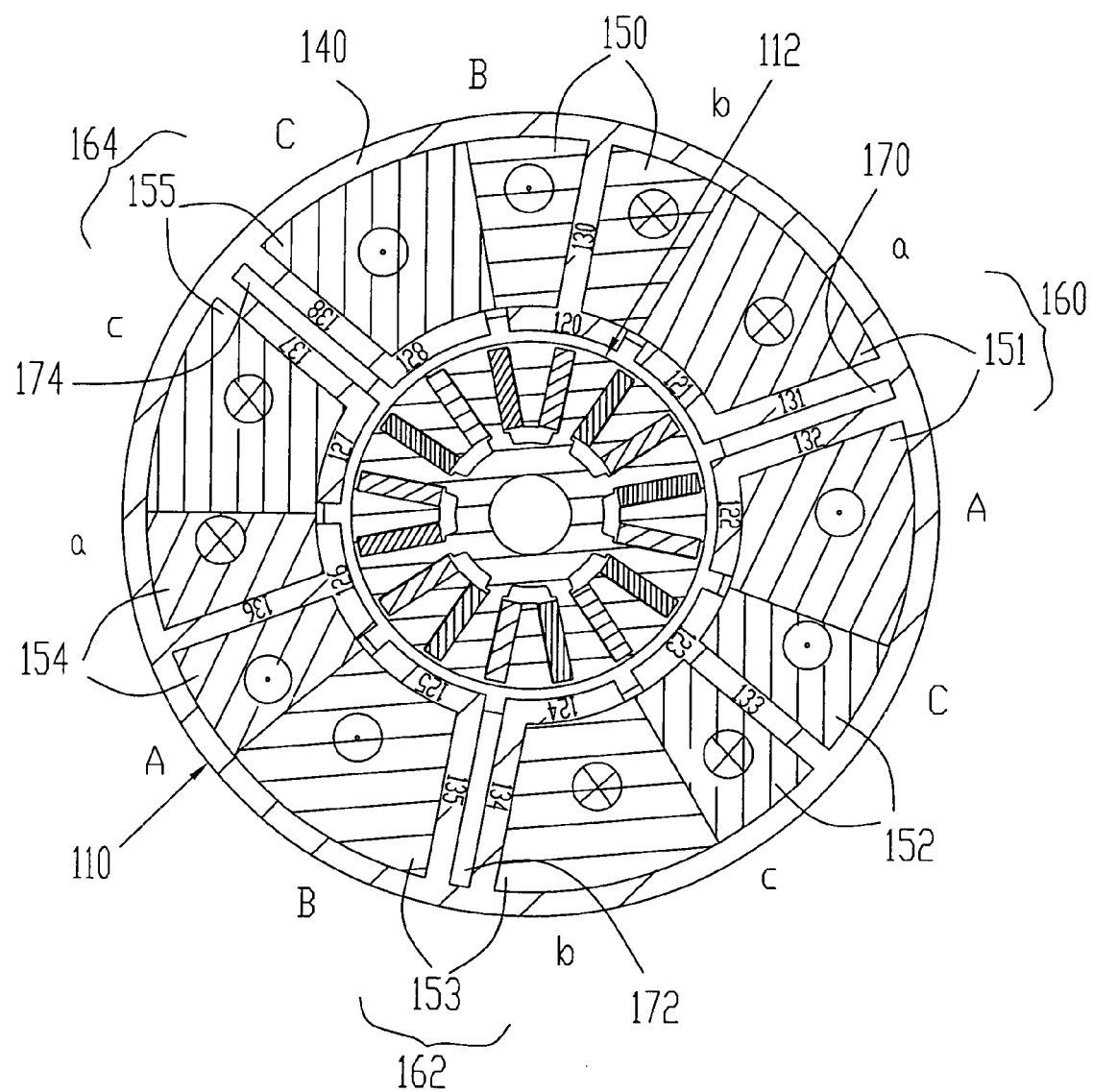
FIG. 2 shows a cross-section through a motor according to the invention.

FIG. 2 shows an embodiment of a motor according to the invention which has the same number of poles and number of slots as the motor shown in FIG. 1. Apart from the windings, the parts of the motor shown in FIG. 2 corresponding to those shown in FIG. 1 are indicated by corresponding reference numbers each prefixed with a "1". The rotor 112 of the motor according to the invention corresponds to the rotor 12 of the motor illustrated in FIG. 1 and is not described again here.

Like the stator in the prior art, the stator 110 of the DC motor according to the invention has a magnetic back yoke ring (stator yoke) 140 that carries stator pole bridges 130 to 138 extending radially inwards. Pole heads 120 to 128 are disposed at the radially inner ends of the stator poles, the pole heads being held at regular intervals in a circle about the circumference of the rotor 112. The arrangement of the pole heads 120 to 128 and the slots formed between them corresponds to the arrangement of the prior art as shown in FIG. 1. However, in the case of the motor according to the invention, each stator slot 170, 172, 174 between two adjoining pole bridges 131, 132; 134, 135; 137, 138 of a stator pole group 160, 162, 164 is left free because the corresponding winding sections would make no contribution to the build up of torque, as explained above. Moreover, these stator slots 170, 172, 174 between the adjoining stator poles of a stator pole group 160, 162, 164 are made significantly smaller in that the corresponding stator pole bridges 131, 132; 134, 135; and 137, 138 are moved towards each other to the width of a stator pole gap. This goes to increase the winding space available for the remaining windings 150 to 155.

The construction according to the invention produces a stator 110 in which the stator pole bridges 130 to 138 are not always connected in the middle of the pole heads 120 to 128. In fact, to maximize the effective winding space, the stator pole bridges 131, 132; 134, 135; 137, 138 are moved towards each other to the width of a stator pole gap so that they are flush with the ends located opposite each other of the corresponding adjoining pole heads 121, 122; 124, 125; 127, 128. These pole bridges and pole heads correspond to stator pole groups 160, 162, 164, which, in the prior art, bear the same phase, whereas in the stator 110 illustrated in FIG. 2, the corresponding phase winding is wound over both stator poles 131, 132; 134, 135; 137, 138 of a group 160, 162, 164. This applies to windings 151, 153 and 155, while the remaining windings 150, 152, 154 are only wound over one stator pole 130, 133, 136 as is normally the case.

The arrangement according to the invention has the advantage that more winding space is made available for the effective windings, i.e. the windings that contribute to the build up of torque, whereas the ineffective winding sections can be omitted. Nonetheless, a DC motor with the same combination of the number of poles and slots and the same relative spatial arrangement of rotor poles and stator slots as in the prior art can be provided. Thus for the same overall size and pole/slot combination, it is possible to realize a motor that has higher efficiency.

As in the embodiment illustrated in FIG. 1, each of the windings 150 to 155 is associated with one of the three phases A, B or C.

The winding sections indicated by capital letters have a winding direction that points out of the drawing plane and the winding sections indicated by small letters have a winding direction that leads into the plane of the drawing. If a smaller letter follows a capital letter clockwise, the winding direction seen from the rotor is in a clockwise direction about the respective stator pole bridge. If a capital letter follows a small letter clockwise, the winding direction seen from the rotor is anticlockwise.

The motor according to the invention is particularly suited for winding patterns having two adjoining equiphase windings with the same winding direction. Examples of such motors are combinations of 9 (nine) slots and 2 (two) rotor poles, 9 (nine) slots and 16 (sixteen) poles, 15 (fifteen) slots and 4 (four) poles as well as 18 (eighteen) slots and 4 (four) poles.

If a winding generates a magnetic flux that is guided to more than one pole head, for example windings that extend over two pole bridges of a stator pole group, this winding can be made stronger or given more turns than windings that generate a magnetic flux in one pole head. This goes to ensure that the forces that are generated by the individual pole heads are the same and do not depend on whether the pole head is associated with a stator pole group or a single stator pole. This makes it possible to achieve improved synchronism in motors according to the invention. Moreover, the cross-section of the pole bridges of the stator pole groups can be adjusted to the intensity of the magnetic flux that is generated by the associated windings in order to avoid different degrees of saturation of the magnetic material and to provide all pole heads with the same maximum flux and thus with the same dynamic effect on the rotor.

The stator poles and the back yoke are preferably formed as one piece from a stamped lamination stack although it is also possible to form the pole heads integrally with the pole bridges and to secure these to the back yoke.

Figure 3:
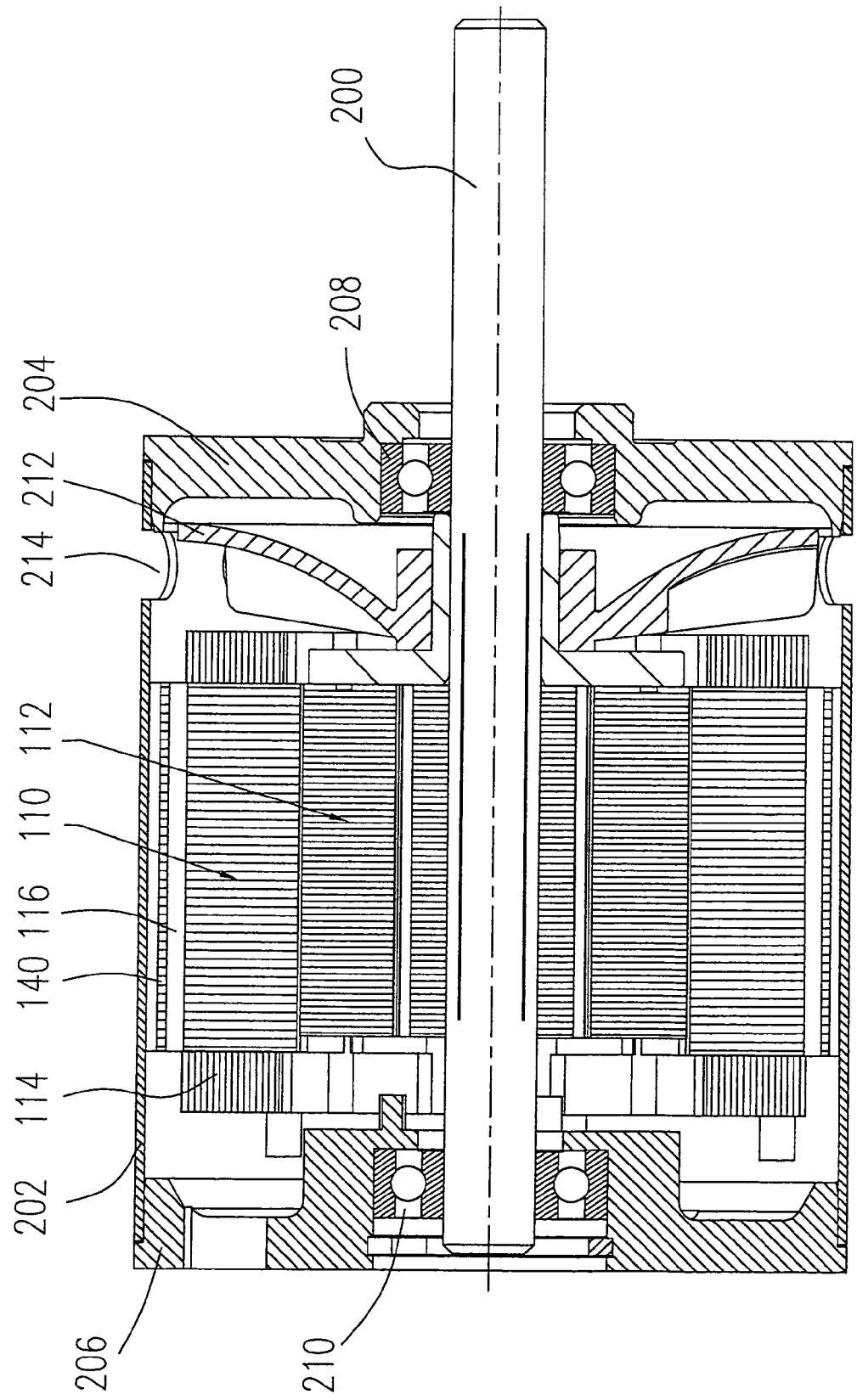
FIG. 3 shows a longitudinal section through a motor according to the invention.

FIG. 3 shows a longitudinal section through the motor according to the invention. The illustration in FIG. 3 shows the rotor 112 which is mounted onto a shaft 200 and constructed as shown in FIG. 2. The rotor is concentrically inserted into the stator 110, an outer back yoke ring (stator yoke) 140 of the stator and windings 114 being illustrated schematically in FIG. 3. In the illustrated embodiment, both the rotor 112 and the stator 110 are formed as lamination stacks. The stator and the rotor are enclosed by a housing wall 202 within which the stator 110 is held. The housing is sealed at both its end faces by a first and a second housing cover 204, 206. The housing covers 204, 206 act as end plates and can also be designed as flanges. Bearings 208, 210 to journal the shaft 200 and the rotor 112 mounted onto the shaft are integrated into the housing cover 204, 206. In the illustrated embodiment, a fan wheel 212 is mounted onto the shaft, the fan wheel being used to ventilate the motor via the openings 214 in the housing wall 202.

Although an inner rotor motor has been described, the invention can also be correspondingly applied to an outer rotor motor.

The characteristics revealed in the above description, the claims and the figures can be important for the realization of the invention in its various embodiments both individually and in any combination whatsoever.

What is claimed is:

1. A direct current motor comprising:
   a stator having a plurality of radially arranged stator pole bridges, each stator pole bridge corresponding to one stator pole, and each stator pole being assigned to one phase,
   at least one stator pole group is formed by at least two adjacent stator pole bridges which are assigned to the same phase,
   wherein no winding sections are provided between the adjacent stator pole bridges of the at least one stator pole group
   and, wherein the respective stator pole bridges of the at least one stator pole group are disposed with a smaller spacing between each other than two adjacent pole bridges that are assigned to different phases.

2. The direct current motor according to claim 1, wherein the at least one stator pole group is formed by exactly two adjacent stator pole bridges.

3. The direct current motor according to claim 1, wherein for each phase one or two stator pole groups are provided, each of which is formed from two stator pole bridges.

4. The direct current motor according to claim 2, wherein for each phase one or two stator pole groups are provided, each of which is formed from two stator pole bridges.

5. The direct current motor according to claim 1, wherein each stator pole bridge is magnetically connected to a pole head and that stator pole gaps are formed between the pole heads, the stator pole gaps being evenly distributed in a circle about the circumference of a rotor.

6. The direct current motor according to claim 5, wherein the spacing between two stator pole bridges of a stator pole group corresponds to the width of the stator pole gap of the associated stator pole bridges.

7. The direct current motor according to claim 1, wherein the winding of the phase that is allocated to a respective at least one stator pole group is wound over both pole bridges of said respective at least one stator pole group.

8. The direct current motor according to claim 6, wherein the winding of the phase that is allocated to a respective at least one stator pole group is wound over both pole bridges of said respective at least one stator pole group.

9. The direct current motor according to claim 1, wherein between two adjacent stator pole groups, at least one stator pole bridge is disposed, and the phase of said at least one stator pole bridge differs from the phases of the adjoining stator pole bridges.

10. The direct current motor according to claim 5, wherein between two adjacent stator pole groups, at least one stator pole bridge is disposed and the phase of said at least one stator pole bridge differs from the phases of the adjacent stator pole bridges.

11. The direct current motor according to claim 5 comprising nine stator pole bridges and two or sixteen rotor poles, or alternatively fifteen or eighteen stator pole bridges and four rotor poles.

12. The direct current motor according to claim 5 comprising two rotor poles and alternatively 12, 15 or 18 stator pole bridges.

13. The direct current motor according to claim 1, wherein said motor comprises three phases.

14. A direct current motor comprising:
a stator having a plurality of radially arranged stator pole bridges, each stator pole bridge corresponding to one stator pole, and each stator pole being assigned to one phase,
at least one stator pole group is formed by at least two adjacent stator pole bridges which are assigned to the same phase,
no winding section are provided between the adjacent stator pole bridges of the at least one pole group and,
wherein the respective stator pole bridges of the at least one stator pole group are disposed with a smaller spacing between each other than two adjacent pole bridges that are assigned to different phases, and
wherein at least one stator pole group is formed by at exactly two adjoining stator pole bridges and wherein for each phase one or two stator pole groups are provided each of which is formed from two stator pole bridges.

15. A direct current motor comprising:
a stator having a plurality of radially arranged stator pole bridges, each stator pole bridge corresponding to one stator pole, and each stator pole being assigned to one phase,
at least one stator pole group is formed by at least two adjacent stator pole bridges which are assigned to the same phase,
no winding sections are provided between the adjacent stator pole bridges of the at least one stator pole group,
the respective stator pole bridges of the at least one stator pole group are disposed with a smaller spacing between each other than two adjacent pole bridges that are assigned to different phases,
wherein each stator pole bridge is magnetically connected to a pole head and that stator pole gaps are formed between the pole heads, the stator pole gaps being evenly distributed in a circle about the circumference of a rotor, and wherein the spacing between two stator pole bridges of a stator pole group corresponds to the width of the stator pole gap of the associated stator pole bridges.

16. The direct current motor according to claim 15, wherein the winding of the phase that is allocated to the stator pole group is wound over both pole bridges of said stator pole group.

17. A direct current motor comprising:
a stator having a plurality of radially arranged stator pole bridges, each stator pole bridge corresponding to one stator pole, and each stator pole being assigned to one phase,
at least one stator pole group is formed by at least two adjacent stator pole bridges which are assigned to the same phase,
no winding sections are provided between the adjacent stator pole bridges of the at least one stator pole group,
the respective stator pole bridges of the at least one stator pole group are disposed with a smaller spacing between each other than two adjacent pole bridges that are assigned to different phases, and
wherein between two adjacent stator pole groups, at least one stator pole bridge is disposed, and the phase of said at least one stator pole bridge differs from the phases of the adjoining stator pole bridges.

18. A direct current motor comprising:
a stator having a plurality of radially arranged stator pole bridges, each stator pole bridge corresponding to one stator pole, and each stator pole being assigned to one phase,
at least one stator pole group is formed by at least two adjacent stator pole bridges which are assigned to the same phase,
no winding sections are provided between the adjacent stator pole bridges of the at least one stator pole group and, the respective stator pole bridges of the at least one stator pole group are disposed with a smaller spacing between each other than two adjacent pole bridges that are assigned to different phases,
wherein each stator pole bridge is magnetically connected to a pole head and that stator pole gaps are formed between the pole heads, the stator pole gaps being evenly distributed in a circle about the circumference of a rotor, and further comprising nine stator pole bridges and two or sixteen rotor poles, or alternatively fifteen or eighteen stator pole bridges and four rotor poles.

19. A direct current motor comprising:
a stator having a plurality of radially arranged stator pole bridges, each stator pole bridge corresponding to one stator pole, and each stator pole being assigned to one phase,
at least one stator pole group is formed by at least two adjacent stator pole bridges which are assigned to the same phase,
no winding sections are provided between the adjacent stator pole bridges of the at least one stator pole group and, the respective stator pole bridges of the at least one stator pole group are disposed with a smaller spacing between each other than two adjacent pole bridges that are assigned to different phases,
wherein each stator pole bridge is magnetically connected to a pole head and that stator pole gaps are formed between the pole heads, the stator pole gaps being evenly distributed in a circle about the circumference of a rotor, and further comprising two rotor poles and alternatively 12, 15 or 18 stator pole bridges.

* * * * *